United States Patent
Kimura

(10) Patent No.: US 9,152,281 B2
(45) Date of Patent: Oct. 6, 2015

(54) MANUFACTURING METHOD FOR TOUCH SCREEN PANEL

(71) Applicant: Samsung Display Co., Ltd., Yongin, Gyeonggi-Do (KR)

(72) Inventor: Toru Kimura, Yongin (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 240 days.

(21) Appl. No.: 13/788,434

(22) Filed: Mar. 7, 2013

(65) Prior Publication Data

US 2014/0115878 A1 May 1, 2014

(30) Foreign Application Priority Data

Oct. 30, 2012 (KR) .................. 10-2012-0121443

(51) Int. Cl.
*G06F 3/041* (2006.01)
*G06F 3/044* (2006.01)

(52) U.S. Cl.
CPC ...... *G06F 3/044* (2013.01); *G06F 2203/04103* (2013.01); *Y10T 29/49105* (2015.01)

(58) Field of Classification Search
CPC ........... G06F 3/044; G06F 2203/04103; Y10T 29/49105

USPC .......................... 29/592.1, 825, 846; 345/171
See application file for complete search history.

(56) References Cited

U.S. PATENT DOCUMENTS

| 2008/0017913 A1 | 1/2008 | Yoon et al. |
| 2009/0008124 A1 | 1/2009 | Umeno et al. |
| 2009/0167703 A1* | 7/2009 | You et al. ................. 345/173 |
| 2012/0113063 A1 | 5/2012 | Kim et al. |

FOREIGN PATENT DOCUMENTS

| CN | 101068033 A | * 11/2007 |
| KR | 10-2008-0008758 A | 1/2008 |
| KR | 10-2008-0087134 A | 9/2008 |
| KR | 10-2011-0048686 A | 5/2011 |
| KR | 10-2012-0050169 A | 5/2012 |

* cited by examiner

*Primary Examiner* — Carl Arbes
(74) *Attorney, Agent, or Firm* — Knobbe Martens Olson & Bear LLP

(57) ABSTRACT

In one aspect, a method of manufacturing a touch screen panel including forming sensing electrodes for touch sensing on a substrate; forming metal patterns for electrical connection of the sensing electrodes on the sensing electrodes; forming a first protective layer including any one of silicon nitride (SiN) and silicon oxide (SiO) on the metal patterns; and forming a second protective layer including the other of the silicon nitride (SiN) and the silicon oxide (SiO) on the first protective layer is provided.

7 Claims, 4 Drawing Sheets

MANUFACTURING METHOD FOR TOUCH SCREEN PANEL

CROSS-REFERENCE TO RELATED APPLICATIONS

This application claims priority to and the benefit of Korean Patent Application No. 10-2012-0121443, filed on Oct. 30, 2012 in the Korean Intellectual Property Office, the disclosure of which is incorporated herein by reference in its entirety.

BACKGROUND

1. Field

The described technology generally relates to a manufacturing method of a touch screen panel, and more particularly, to a manufacturing method of a touch screen panel, which can improve adhesion between laminated layers constituting the touch screen panel.

2. Description of the Related Technology

A touch screen panel is an input device that allows a user's instruction to be inputted by selecting an instruction content displayed on a screen of an image display and the like with a user's hand or an object.

The touch screen panel may be formed on a front face of the screen to allow input of instructions by converting a contact position into an electrical signal. Here, the user's hand or object is directly in contact with the touch screen panel at the contact position. Accordingly, the instruction content selected at the contact position is inputted as an input signal to the image display.

Since such a touch screen panel can be substituted for a input device connected to an image display, such as a keyboard or mouse, its field of use has been gradually expanded.

Touch screen panels may be divided into categories including the following types: a resistive overlay touch screen panel, a photosensitive touch screen panel, a capacitive touch screen panel, and the like.

Among these types of touch screen panels, the capacitive touch screen panel senses a change in the capacitance of one conductive sensing electrode formed with another sensing electrode or ground electrode adjacent to the one conductive sensing electrode when a user's hand or object comes in contact with the touch screen panel, thereby converting the contact position into an electrical signal.

In general, a touch screen panel has a laminated structure. The laminated structure may include an indium tin oxide (ITO) layer that is a conductive sensing electrode, a connection pattern between sensing electrodes, a metal layer (Mo/MoNb) that is a wiring pattern, and an insulating protective layer such as silicon oxide ($SiO_2$) which is formed on a substrate.

During operation different types of stress may be applied to the laminated layers constituting the touch screen panel.

Specifically, a compressive stress may be applied to the ITO layer, and a tensile stress may be applied to the metal layer. If a $SiO_2$ insulation protective layer is grown on these layers, the compressive stress may be additionally applied to these layers, and therefore, a difference in stress between the layers may occur, thereby deteriorating the attachment and adhesion between the layers. Accordingly, exfoliation of the laminated layers may occur due to low adhesion in the process of a test (cross-cut tape exfoliation test or chemical resistance test).

SUMMARY

The present embodiments provide a manufacturing method of a touch screen panel, which can prevent exfoliation of laminated layers.

Some embodiments provide a method of manufacturing a touch screen panel, including: forming sensing electrodes for touch sensing on a substrate; forming metal patterns for electrical connection of the sensing electrodes on the sensing electrodes; forming a first protective layer including any one of silicon nitride (SiN) and silicon oxide (SiO) on the metal patterns; and forming a second protective layer including the other of the silicon nitride (SiN) and the silicon oxide SiO) on the first protective layer.

In some embodiments, the metal patterns may have a laminated structure including any one of molybdenum (Mo), molybdenum oxide ($MoO_x$), molybdenum niobium (MoNb), Ag—Pd—Cu (APC) alloy, nickel (Ni), and copper (Cu), or alloy thereof.

In some embodiments, the forming of the first and second protective layers may be performed using a reactive sputtering method.

In some embodiments, the forming of the sensing electrodes may include forming a transparent conductive layer on a substrate; and patterning the transparent conductive layer, thereby forming a plurality of first sensing electrodes formed to be connected along a first direction, and a plurality of second sensing electrodes arranged between the first sensing electrodes and formed to be connected along a second direction intersecting with the first direction.

In some embodiments, the method may further include forming an insulation layer on at least one region in which the first and second sensing electrodes intersect with each other, after forming the first and second sensing electrodes.

In some embodiments, the forming of the metal patterns may include forming a metal layer on the insulation layer; and patterning the metal layer, thereby forming a plurality of connection patterns for connecting the first sensing electrodes in the first direction, and a plurality of outer wires for connecting the first and second sensing electrodes to an external driving circuit.

In some embodiments, a double protective layer of the silicon nitride (SiN) having a compressive stress and the silicon oxide (SiO) having a tensile stress may be formed so that the compressive stress and the tensile stress maintain their balance. Accordingly, it is possible to improve attachment and adhesion between laminated layers and to prevent exfoliation of the laminated layers.

BRIEF DESCRIPTION OF THE DRAWINGS

The accompanying drawings, together with the specification, illustrate exemplary embodiments of the present embodiments, and, together with the description, serve to explain the principles of the present embodiments.

DETAILED DESCRIPTION

Figure 1:
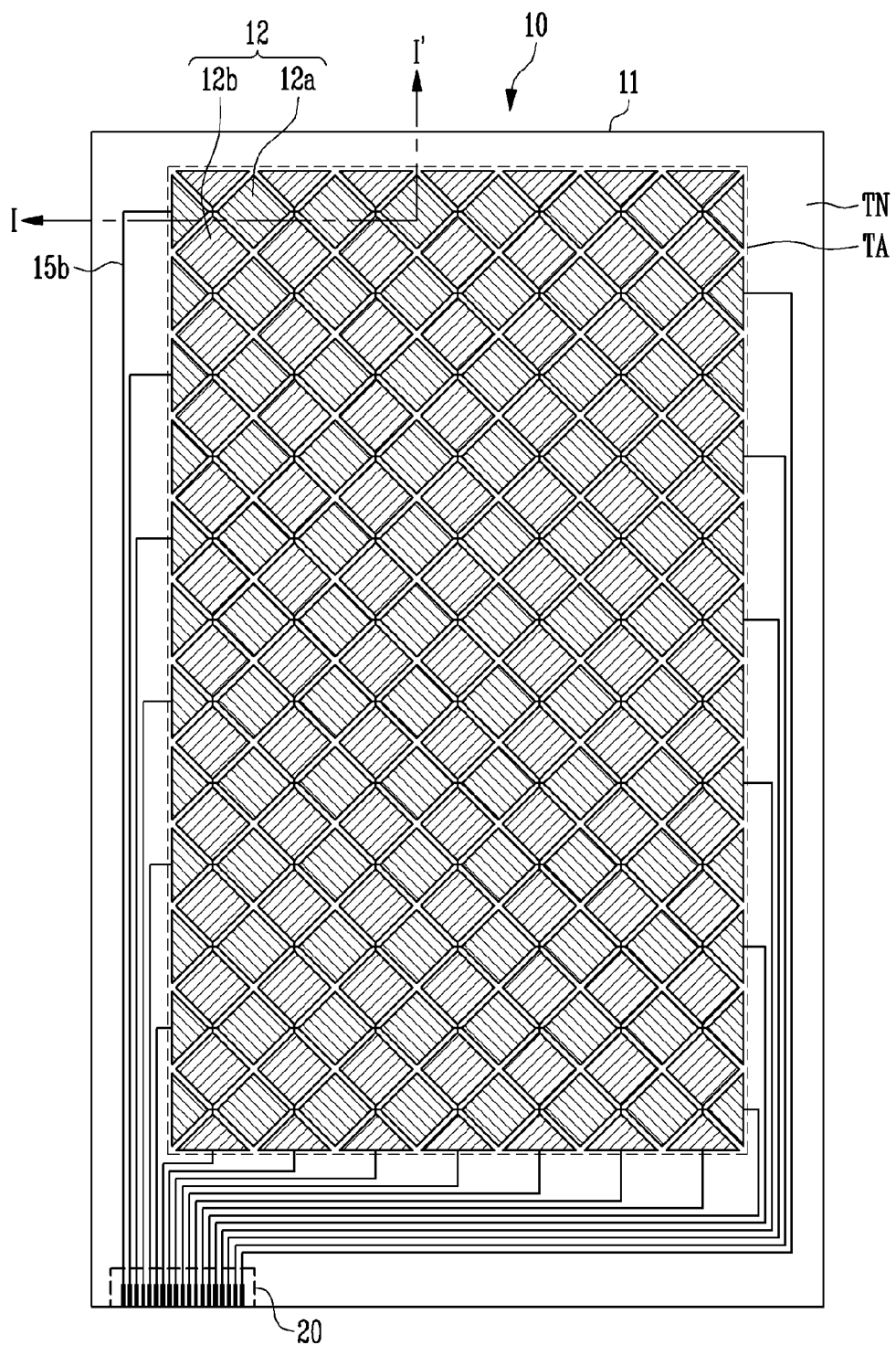
FIG. 1 is a planar view schematically illustrating an example of a touch screen panel.

In the following detailed description, only certain exemplary embodiments of the present disclosure have been shown and described, simply by way of illustration. It is to be understood, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the described element or be indirectly on the another element with one or more intervening elements interposed therebetween. Also, when an element is referred to as being "connected to" another element, it can be directly connected to the described element or be indirectly connected to the described element with one or more intervening elements interposed therebetween. Hereinafter, like reference numerals refer to like elements.

Hereinafter, exemplary embodiments of the present disclosure will be described in detail with reference to the accompanying drawings.

FIG. 1 is a planar view schematically illustrating an example of a touch screen panel.

Referring to FIG. 1, the touch screen panel 10 includes a substrate 11, sensing electrodes 12 formed in a touch active region TA on the substrate 11, and outer wires 15b formed in a touch non-active region TN outside the touch active region TA so as to connect the sensing electrodes 12 to a driving circuit through a pad portion 20.

The sensing electrodes 12 include a plurality of first sensing electrodes 12a dispersed and arranged in the touch active region TA on the transparent substrate 11 and formed to be electrically connected along a first direction, and a plurality of second sensing electrodes 12b dispersed and arranged between the first sensing electrodes 12a so as not to overlap with the first sensing electrodes 12a and formed to be electrically connected along a second direction intersecting with the first direction.

In some embodiments, the first and second sensing electrodes 12a and 12b are alternately arranged so as to be connected along different directions. For example, the first sensing electrodes 12a may be connected along the row direction (horizontal direction) so as to be connected to the respective outer wires 15b for each row line, and the second sensing electrodes 12b may be connected along the column direction (vertical direction) so as to be connected to the respective outer wires 15b for each column line.

In some embodiments, the first and second sensing electrodes 12a and 12b may be formed of a transparent electrode material such as indium tin oxide (ITO) so that light from a display panel (not shown) disposed below the first and second sensing electrodes 12a and 12b can be transmitted through the first and second sensing electrodes 12a and 12b.

In some embodiments, the, a plurality of first connection patterns and a plurality of second connection patterns may be further formed in the touch active region TA on the transparent substrate 11 (not shown). Here, the first connection patterns are arranged along the first direction (e.g., the row direction) so as to connect the first sensing electrodes 12a in the first direction, and the second connection patterns are arranged along the second direction (e.g., the column direction) so as to connect the second sensing electrodes 12b in the second direction. Embodiments of the connection patterns will be described in detail later.

The outer wires 15b may be configured to connect the first and second sensing electrodes 12a and 12b for each line along the first and second directions to the external driving circuit (not shown). For example, the outer wires 15b are respectively connected electrically to the first sensing electrodes 12a for each row line and the second sensing electrodes 12b for each column line, so as to connect the first and second sensing electrodes 12a and 12b to the external driving circuit (not shown) such as a position detecting circuit through the pad portion 20.

The outer wires 15b may be disposed in the touch non-active region TN outside the touch screen panel while avoiding the touch active region TA in which an image is displayed. Since the material of the outer wires 15b is selected in a wide range, the outer wires 15b may be formed of not only a transparent electrode material used to form the sensing electrodes 12 but also a low-resistance metallic material such as molybdenum (Mo), silver (Ag), titanium (Ti), copper (Cu), aluminum (Al) or Mo/Al/Mo.

The touch screen panel according to this embodiment is a capacitive touch screen panel. If a contact object such as a user's finger or stylus pen comes in contact with the touch screen panel, a change in capacitance caused by a contact position is transferred from the sensing electrodes 12 to the driving circuit (not shown) via the outer wires 15b and the pad portion 20. Then, the change in capacitance is converted into an electrical signal by X and Y input processing circuits (not shown), thereby detecting the contact position.

Figure 2:
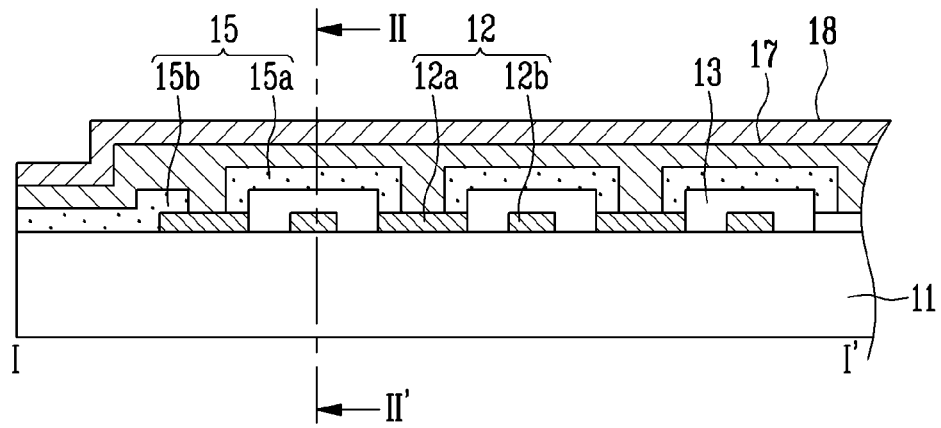
FIG. 2 is a cross-sectional view taken along line I-I' of the touch screen panel in FIG. 1.
Figure 3:
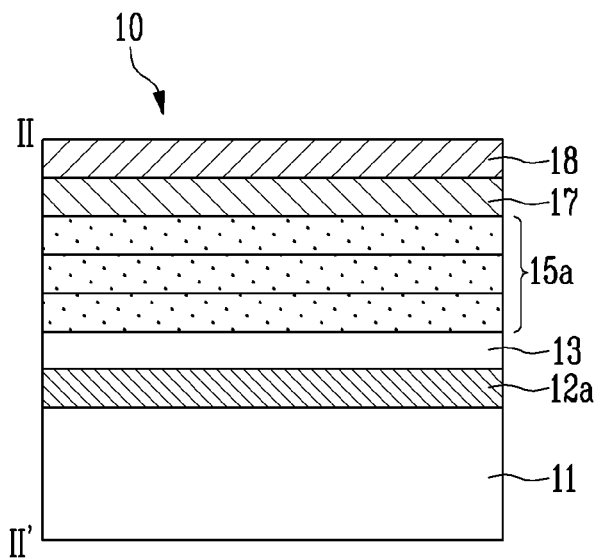
FIG. 3 is a cross-sectional view showing a laminated structure of the touch screen panel taken along line II-II' of FIG. 2.

FIG. 2 is a sectional view taken along line I-I' of the touch screen panel in FIG. 1. FIG. 3 is a sectional view showing a laminated structure of the touch screen panel taken along line II-II' of FIG. 2.

Referring to FIGS. 2 and 3, the touch screen panel 10 has a structure in which the substrate 11, the sensing electrodes 12, an insulation layer 13, metal patterns 15, a first protective layer 17 and a second protective layer 18 are sequentially laminated.

In the laminated structure of the present embodiments, each layer may be patterned in a desired shape. That is, each of the sensing electrodes 12, the insulation layer 13 and the metal patterns 15 may be patterned in a desired shape, and the formed patterns at least partially overlap with one another, thereby forming the laminated structure of the present embodiments. Thus, partial regions of the sensing electrodes 12, the insulation layer 13 and the metal patterns 15 can be removed by the patterning.

In some embodiments, the substrate 11 may be formed of a transparent insulative material.

In some embodiments, the substrate 11 may be set as an upper substrate of the display panel (not shown), so as to be integrally formed with the display panel (not shown).

In some embodiments, the sensing electrodes 12 are formed as electrode patterns for touch sensing on the substrate 11. In some embodiments, the sensing electrodes 12 may be formed of a transparent electrode material such as ITO so that light from the display panel (not shown) disposed below the sensing electrodes 12 can be transmitted through the sensing electrodes 12.

In some embodiments, the sensing electrodes 12 include the plurality of first sensing electrodes 12a formed to be connected along the first direction, and the plurality of second sensing electrodes 12b arranged between the first sensing electrodes 12a and formed to be connected along the second direction intersecting with the first direction.

In some embodiments, the first and second sensing electrodes 12a and 12b may be dispersed in the touch active region TA. In this case, the first and second sensing electrodes 12a and 12b are alternately arranged to be connected along different directions. For example, the directions may be perpendicular to each other.

In some embodiments, the touch active region TA overlaps with an image display region of the display panel (not shown) disposed below the touch screen panel 10 so as to be viewed from the outside of the touch screen panel 10. In some embodiments, the touch non-active region TN formed outside the touch active region TA overlaps with a non-display region of the display panel (not shown), and is not viewed from the outside of touch screen panel 10 by a frame covering the non-display region or a light shielding layer shielding light.

In some embodiments, the insulation layer 13 may be partially formed in a region that requires the security of insulation properties between the sensing electrodes 12 and the metal patterns 15.

In some embodiments, the metal patterns 15 include a plurality of connection patterns 15a for connecting the first sensing electrodes 12a along the first direction, and the outer wires 15b for connecting the first and second sensing patterns 12a and 12b to the external driving circuit (not shown).

Referring to FIGS. 4E to 4H, the connection patterns 15a electrically connect adjacent first sensing electrodes 12a while being insulated from the second sensing electrodes 12b with the insulation layer 13 interposed therebetween.

In some embodiments, the outer wires 15b are formed in the touch non-active region TN, and connect the first and second sensing electrodes 12a and 12b for each line along the first and second directions to the external driving circuit (not shown).

In some embodiments, the metal patterns 15 are formed on the sensing electrodes 12, and have a laminated structure including any one of molybdenum (Mo), molybdenum oxide ($MoO_x$), molybdenum niobium (MoNb), Ag—Pd—Cu (APC) alloy, nickel (Ni), and copper (Cu), or alloy thereof.

In some embodiments, the material and thickness of the metal patterns 15 may be selectively changed when necessary. For example, the metal patterns 15 may have a triple-layered structure of molybdenum and molybdenum alloy.

In some embodiments, the first protective layer 17 may be formed on the metal patterns 15, and includes any one of silicon nitride (SiN) and silicon oxide (SiO). In some embodiments, the first protective layer 17 may be formed on the metal patterns 15, and include silicon nitride (SiN). In some embodiments, the first protective layer 17 may be formed on the metal patterns 15, and silicon oxide (SiO).

In some embodiments, the second protective layer 18 may be formed on the first protective layer 17, and includes the other of the silicon nitride (SiN) and the silicon oxide SiO). In some embodiments, the first protective layer 17 may include silicon nitride (SiN). In some embodiments, the first protective layer 17 may include silicon oxide SiO). In some embodiments, the first protective layer 17 may include silicon nitride (SiN) and the second protective layer 18 may include silicon oxide (SiO). In some embodiments, the first protective layer 17 may include silicon oxide (SiO) and the second protective layer 18 may include silicon nitride (SiN).

According to embodiments configured as described above, a double protective layer of the silicon nitride (SiN) having a compressive stress and the silicon oxide (SiO) having a tensile stress may be formed so that the compressive stress and the tensile stress maintain their balance. Accordingly, it is possible to improve attachment and adhesion between laminated layers and to prevent exfoliation of the laminated layers.

Specifically, the internal stress of the laminated layers may be divided into a tensile stress and a compressive stress. Here, the tensile stress is a stress generated in a thin film when the surface having the thin film grown thereon is formed concave, and the compressive stress is a stress generated in a thin film when the surface having the thin film grown thereon is formed convex.

In some embodiments, the sensing electrodes 12 receive the compressive stress, and the metal patterns 15, particularly a molybdenum metal thin film receives the tensile stress. In some embodiments, the silicon nitride used as the protective layer 17 or 18 receives the tensile stress, and the silicon oxide used as the protective layer 17 or 18 receives the compressive stress.

In the touch screen panel 10 of the present embodiments, protective layers formed as a single layer made of a single material may be configured as double layers made of different materials, so that the different stresses entirely maintain their balance.

FIGS. 4A to 4H are sectional views sequentially illustrating steps of a method of manufacturing a touch screen panel according to an embodiment of the present disclosure.

Figure 4A:
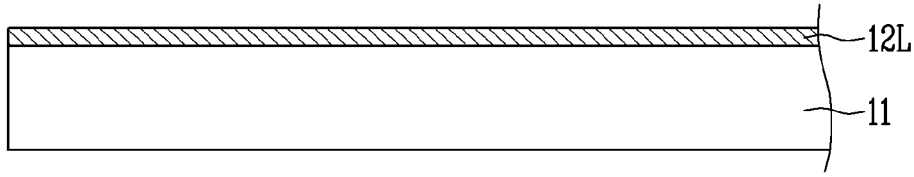
FIGS. 4A to 4H are cross-sectional views sequentially illustrating a method of manufacturing a touch screen panel according to an aspect of the present embodiments.
Figure 4B:
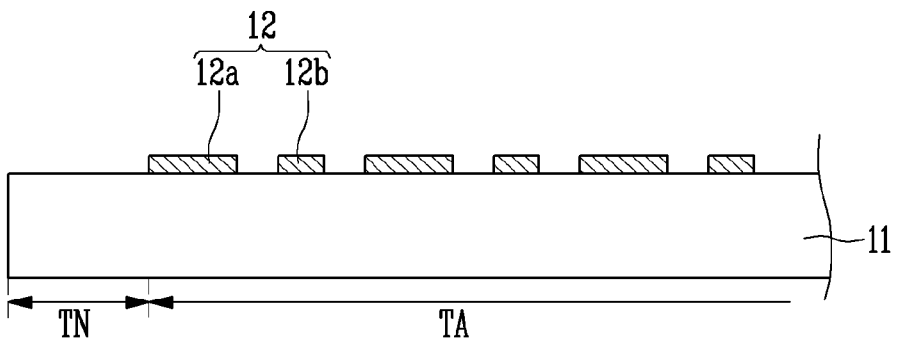

Referring to FIGS. 4A and 4B, a transparent conductive layer 12L is formed on a substrate 11, and sensing electrodes 12 are formed by patterning the transparent conductive layer 12L.

In some embodiments, the process of patterning the sensing electrodes 12 may be performed using a photolithography method.

For example, a photoresist pattern (not shown) may be formed on the transparent conductive layer 12L, and an etching process may be performed using the photoresist pattern as a mask, thereby forming first and second sensing electrodes 12a and 12b.

After the etching process is finished, a stripping process of removing remaining photoresist pattern may be further performed.

Figure 4C:
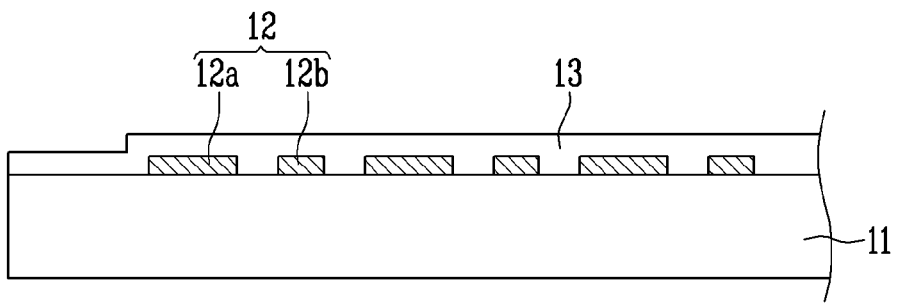
Figure 4D:
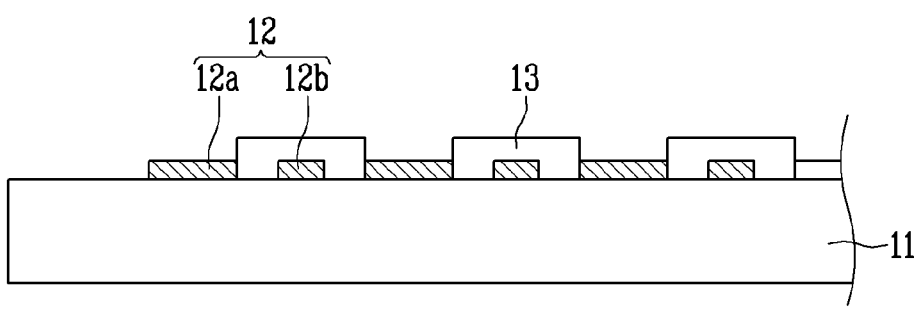

Referring to FIGS. 4C and 4D, an insulation layer 13 may be formed on at least one region of the first and second sensing electrodes 12a and 12b.

The insulation layer 13 functions to electrically insulate between connection patterns 15a (See FIG. 4F) and the second sensing electrodes 12b, and may be patterned to be formed on only regions in which the connection patterns 15a and the second sensing electrodes 12b overlap with each other.

Although it has been illustrated in this embodiment that the insulating layer 13 is formed between the first and second sensing electrodes 12a and 12b, the insulation layer 13 may be formed to entirely cover the first and second sensing electrodes 12a and 12b.

Figure 4E:
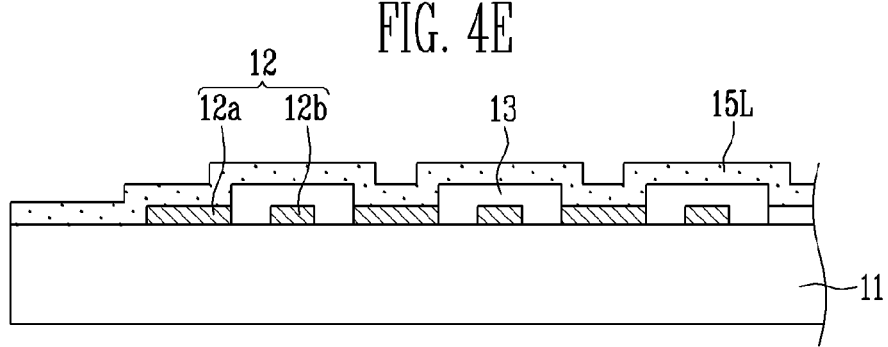
Figure 4F:
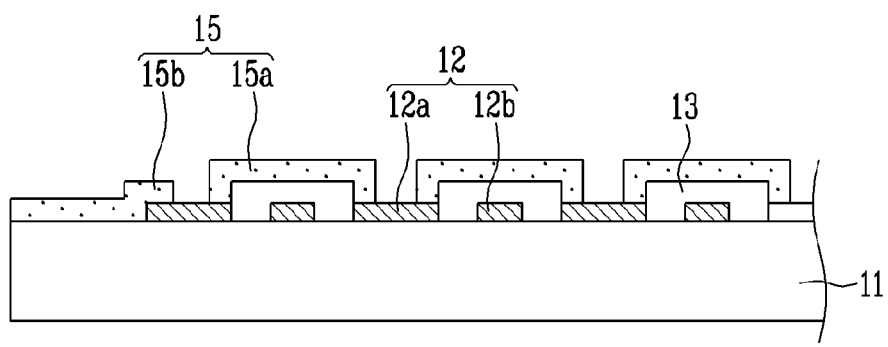

Referring to FIGS. 4E and 4F, metal patterns 15 are formed by growing a metal layer 15L made of a low-resistance metallic material and patterning the metal layer 15L.

In some embodiments, the process of growing the metal layer 15L may be performed using a sputter deposition method.

Sputtering as a kind of vacuum deposition method refers to a method of forming a thin film on a base substrate, wherein a desired atom is sputtered by accelerating gas such as argon ionized using plasma generated at a relatively low degree of vacuum and allowing the gas to collide with a target.

Next, connection patterns 15a and outer wires 15b may be formed by patterning the metal layer 15L. Like the process of pattering the transparent conductive layer 12L, the process of patterning the metal layer 15L may be performed using the photolithography method.

Figure 4G:
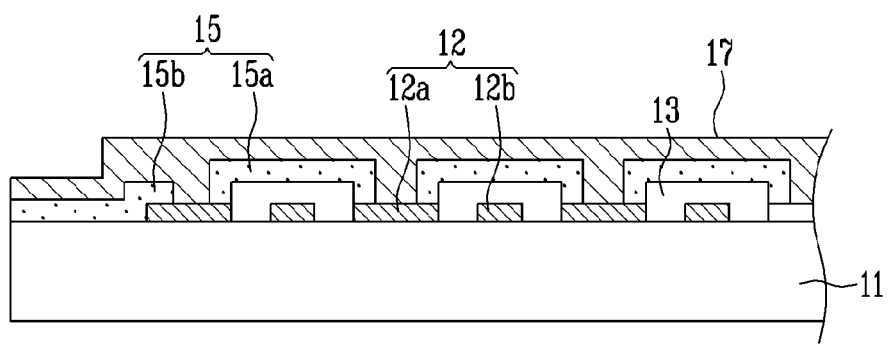
Figure 4H:
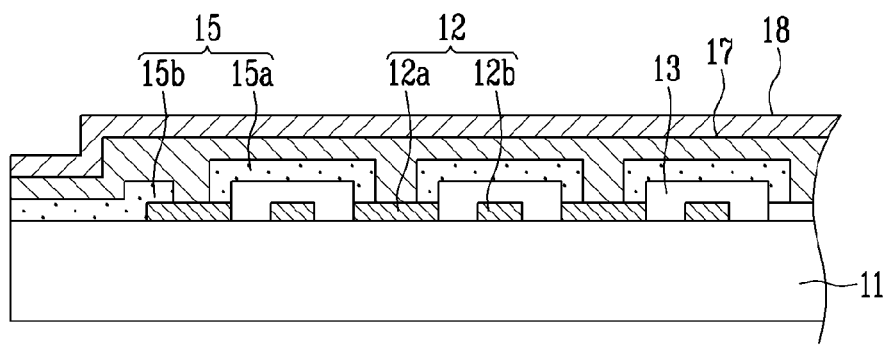

Referring to FIGS. 4G and 4H, a first protective layer 17 including any one of silicon nitride and silicon oxide is formed on the metal patterns 15, and a second protective layer 18 including the other of the silicon nitride and the silicon oxide is formed on the first protective layer 17. In some embodiments, the first protective layer 17 may be formed on the metal patterns 15, and include silicon nitride (SiN). In some embodiments, the first protective layer 17 may be formed on the metal patterns 15, and include silicon oxide (SiO).

In some embodiments, the first and second protective layers 17 and 18 form a heterogeneous layer by using different materials.

In some embodiments, if the first protective layer 17 is made of silicon oxide (SiO), the second protective layer 18 is made of silicon nitride (SiN). In some embodiments, if the first protective layer 17 is made of the silicon nitride (SiN), the second protective layer 18 is made of the silicon oxide (SiO). In this embodiment, the first protective layer 17 is made of the silicon nitride (SiN), and the second protective layer 18 is made of the silicon oxide SiO). In some embodiments, the silicon nitride (SiN) may be replaced with silicon oxynitride (SiON).

In some embodiments, the process of forming the first and second protective layers 17 and 18 may be performed using a reactive sputtering method. In some embodiments, the silicon nitride may be deposited using a mixed gas of argon and nitrogen, and the silicon oxide may be deposited using a mixed gas of argon and oxygen.

In some embodiments, the first and second protective layers 17 and 18 may pass through the patterning process when necessary.

Although it has been described in this embodiment that the first and second protective layers 17 and 18 are formed using the sputtering method, the present embodiments are not limited thereto. That is, the first and second protective layers 17 and 18 may be formed using various other methods.

While the present embodiments have been described in connection with certain exemplary embodiments, it is to be understood that the present embodiments are not limited to the disclosed embodiments and are intended to cover various modifications and equivalent arrangements included within the spirit and scope of the appended claims, and equivalents thereof.

What is claimed is:

1. A method of manufacturing a touch screen panel, comprising:

forming sensing electrodes for touch sensing directly on a substrate;

forming metal patterns for electrical connection of the sensing electrodes directly on the sensing electrodes;

forming a first protective layer including any one of silicon nitride (SiN) and silicon oxide (SiO) directly on the metal patterns; and forming a second protective layer including the other of the silicon nitride (SiN) and the silicon oxide (SiO) directly on the first protective layer.

2. The method according to claim 1, wherein the metal patterns have a laminated structure including at least one selected from the group consisting of molybdenum (Mo), molybdenum oxide ($MoO_x$), molybdenum niobium (MoNb), Ag—Pd—Cu (APC) alloy, nickel (Ni), and copper (Cu), or alloy thereof.

3. The method of claim 1, wherein the forming of the first and second protective layers is performed using a reactive sputtering method.

4. The method of claim 1, wherein the forming of the sensing electrodes comprises:

forming a transparent conductive layer on the substrate; and patterning the transparent conductive layer, thereby forming a plurality of first sensing electrodes configured to be connected along a first direction, and a plurality of second sensing electrodes arranged between the first sensing electrodes and configured to be connected along a second direction intersecting with the first direction.

5. The method of claim 4, further comprising forming an insulation layer on at least one region in which the first and second sensing electrodes intersect with each other.

6. The method of claim 1, wherein the forming of the metal patterns comprises:

forming a metal layer on the insulation layer; and patterning the metal layer, thereby forming a plurality of connection patterns for connecting the first sensing electrodes in the first direction, and a plurality of outer wires for connecting the first and second sensing electrodes to an external driving circuit.

7. The method of claim 1, wherein the first protective layer comprises silicon nitride (SiN).

* * * * *